(12) United States Patent
Shin

(10) Patent No.: US 7,583,426 B2
(45) Date of Patent: Sep. 1, 2009

(54) FLEXIBLE DISPLAY

(75) Inventor: Kwang Hoon Shin, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 220 days.

(21) Appl. No.: 11/644,556

(22) Filed: Dec. 22, 2006

(65) Prior Publication Data

US 2007/0146861 A1    Jun. 28, 2007

(30) Foreign Application Priority Data

Dec. 28, 2005   (KR) ...................... 10-2005-0132154

(51) Int. Cl.
*G02F 1/07* (2006.01)
(52) U.S. Cl. .................. 359/253; 359/247; 359/272
(58) Field of Classification Search ................ 359/265, 359/296, 253, 272, 267, 247; 430/32
See application file for complete search history.

(56) References Cited

U.S. PATENT DOCUMENTS 6,924,792 B1 * 8/2005 Jessop ........................ 345/179
7,420,549 B2 * 9/2008 Jacobson et al. ............ 345/204

* cited by examiner

*Primary Examiner*—Joseph Martinez
(74) *Attorney, Agent, or Firm*—Brinks Hofer Gilson & Lione

(57) ABSTRACT

A display is disclosed, which can be fabricated without a high-temperature process, and also realize color images, the display including a reflective electrode formed on a flexible substrate; a transparent insulation layer having a predetermined color formed on a surface of the flexible substrate including the reflective electrode; an opposite substrate formed in opposition to the flexible substrate; an opposite electrode and a black matrix formed on an inner surface of the opposite substrate; and an electrolytic layer and a nonelectrolytic layer formed between the flexible substrate and the opposite substrate, where the electrolytic layer is transparent, and the nonelectrolytic layer is nontransparent.

16 Claims, 2 Drawing Sheets

FLEXIBLE DISPLAY

This application claims the benefit of the Korean Patent Application No. P2005-132154, filed on Dec. 28, 2005, which is hereby incorporated by reference as if fully set forth herein.

TECHNICAL FIELD

The present application relates to an electrophoretic display device (EPD), and more particularly, to a flexible display which can be fabricated by a simple structure without a high-temperature process.

BACKGROUND

With the recent trend to the information society, image displays have become important as information transmitters. To use the displays in various fields, it is necessary for the displays to have low power consumption, a thin profile, lightness in weight, and high resolution.

The displays may be classified into a luminous type and a non-luminous type, where the luminous type displays correspond to, for example, an electro-luminescence (EL) display, a vacuum fluorescent display (VFD), and a plasma display panel (PDP); and the non-luminous type display corresponds to, for example, a liquid crystal display (LCD).

Recently, a flexible display has been introduced, which can be kept folded or rolled without damage. Flexible display technologies are applied to the various displays using a thin film transistor (TFT) LCD device, an organic light-emitting diode (OLED), and an electrophoretic display.

A flexible display is generally referred to as a scroll display. The flexible display is formed with a thin plastic substrate, which can be kept folded or rolled without damage. In this respect, the flexible display is one of next-generation displays. At present, the flexible display is applied to the OLED or the LCD so that the OLED or the LCD can be fabricated by the thin profile, of less than 1 mm.

An OLED can emit the light itself, and can result in good visibility in dark surroundings as well as bright surroundings. Among the currently used displays, the OLED has the most rapid response speed, which is one of most important standards to judge the function of mobile display.

Also, the OLED can be used in mobile devices, for example, mobile phones which can be designed with the ultra-thin profile. To realize the flexible display using the OLED, a flexible substrate of plastic is used.

However, the related art flexible display has the following disadvantages: In order to form the flexible display using the OLED, a flexible substrate of plastic is used. However, the process for fabricating the OLED requires a high-temperature step. The use of the high-temperature step is restricted due to the plastic structure, since the plastic substrate is lower in melting point than the glass substrate, and the patterns for driving the OLED are complex.

To apply a high-temperate processing step to the plastic substrate, a method has been proposed where: a glass substrate is adhered to the plastic substrate, the high-temperature step is applied to the glass substrate, and then the glass substrate is removed from the plastic substrate. In this case, the process is complicated due to the additional steps of adhering the glass substrate to the plastic substrate and removing the glass substrate from the plastic substrate. Also, defective devices and the low yield may occur due to the large number of lamination steps.

SUMMARY

A display is described which can be fabricated as a simple structure without a high-temperature process step.

In another aspect, a flexible display is described which can realize color images by adding a pigment into a transparent insulation layer formed on a reflective electrode, and where the flexible display is driven in a reflective mode. Electrolytic and nonelectrolytic layers are provided between two electrodes; an electric field is applied between the electrolytic layer having a relatively large polarity and an nonelectrolytic layer having a relatively small polarity; and the image is displayed as a result of movements of the electrolytic and nonelectrolytic layers.

A flexible display includes a reflective electrode formed on a flexible substrate; a transparent insulation layer having a predetermined color formed on a surface of the flexible substrate including the reflective electrode; a substrate formed opposing the flexible substrate; an electrode and a black matrix formed on an inner surface of the opposing substrate; and an electrolytic layer and a nonelectrolytic layer formed between the flexible substrate and the opposing substrate. The electrolytic layer is transparent, and the nonelectrolytic layer is nontransparent.

In an aspect, the flexible display may be a reflective type display. The electrolytic and nonelectrolytic layers may be provided between the two electrodes; and the electric field is applied between the electrolytic layer having a relatively large polarity and a nonelectrolytic layer having a relatively small polarity. The image is displayed as a result of the movement of the electrolytic and nonelectrolytic layers. When an electric field is applied between the reflective electrode and the opposing electrode, the electrolytic layer moves to the lower side of the opposing electrode, and the nonelectrolytic layer moves to the lower side of the black matrix, so that an image may be displayed through the electrolytic layer. A pigment may be added to the transparent insulation layer formed on the reflective electrode. When the image is displayed by the ambient light passing through the electrolytic layer and reflected on the reflective electrode, the various color-images can be realized through the use of the transparent insulation layer having the pigment therein.

BRIEF DESCRIPTION OF THE DRAWINGS

The accompanying drawings, which are included to provide a further understanding of the invention and are incorporated in and constitute a part of this application, illustrate examples of the invention. In the drawings.

DETAILED DESCRIPTION

Reference will now be made in detail to examples which are illustrated in the accompanying drawings. Wherever possible, the same reference numbers will be used throughout the drawings to refer to the same or like parts.

Figure 1:
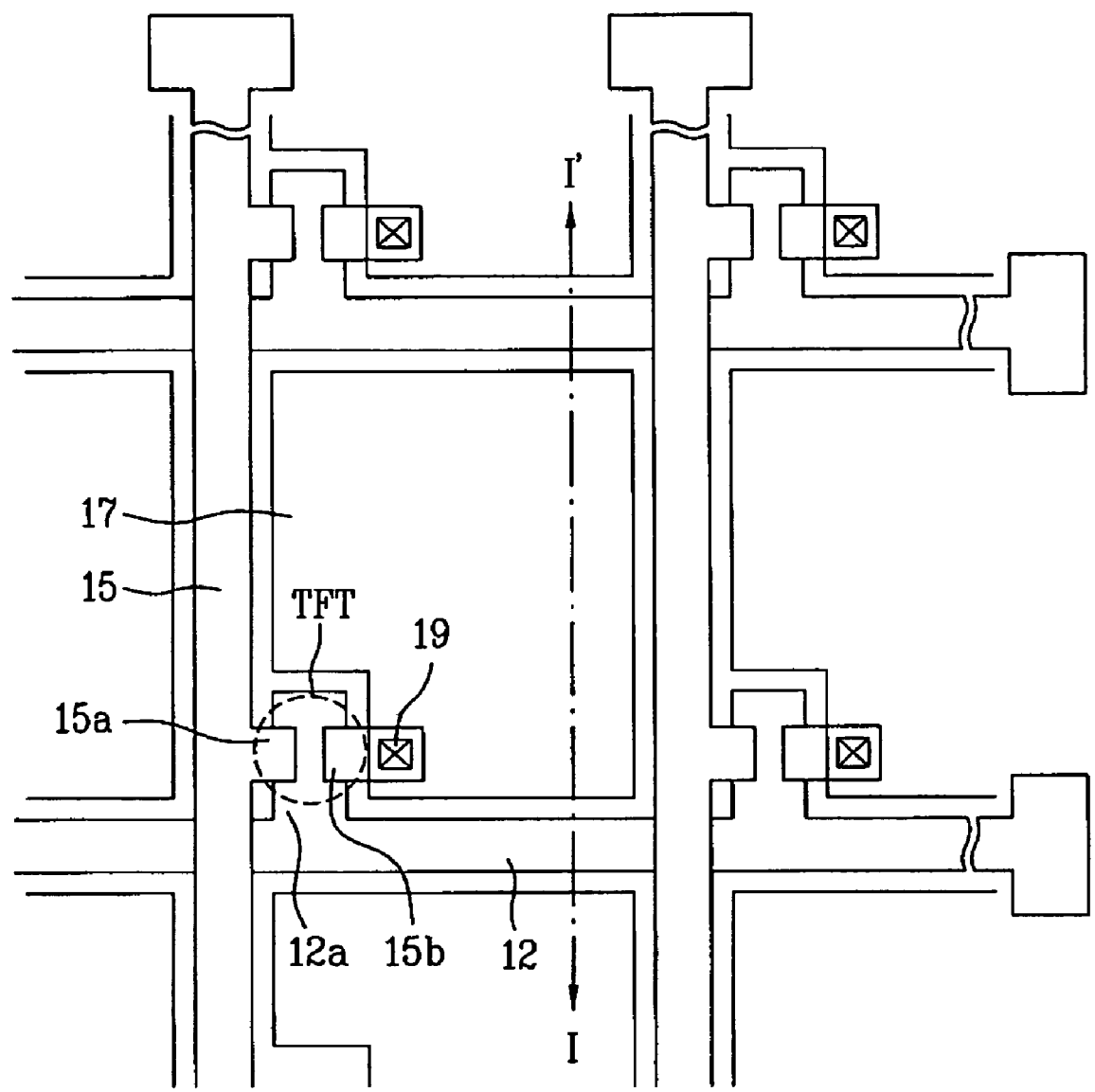
FIG. 1 is a plan view of illustrating an example of a flexible display.
Figure 2:
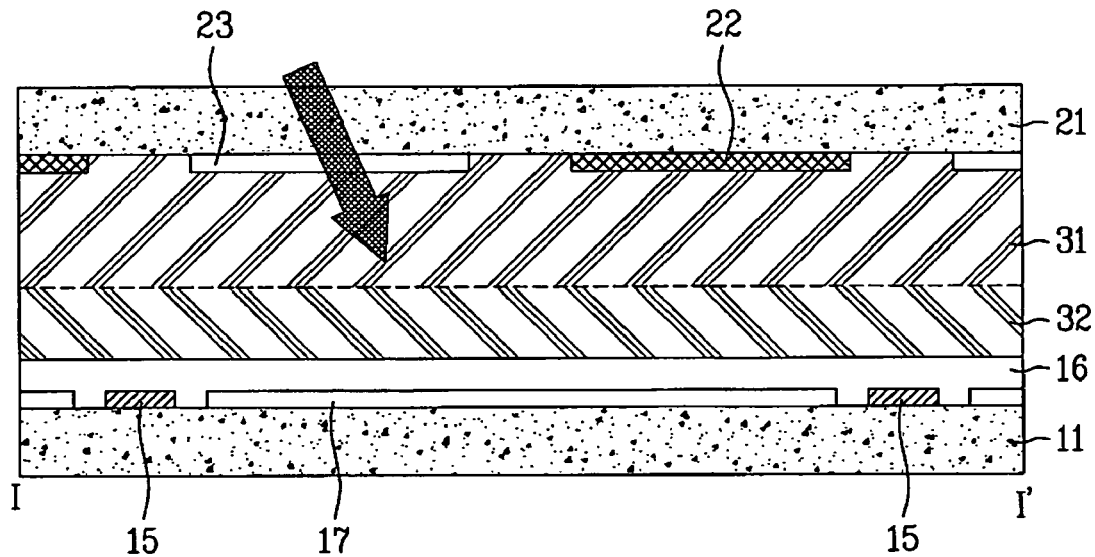
FIG. 2 is a cross section view along I-I' of FIG. 1 when an electric field is not applied to a flexible display.
Figure 3:
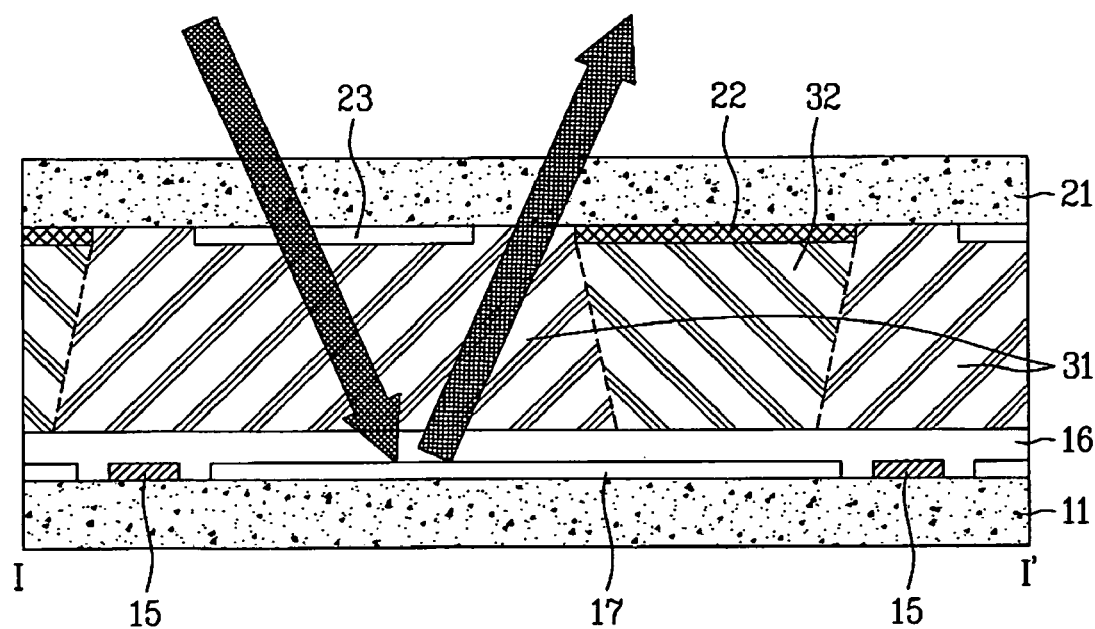
FIG. 3 is a cross section view along I-I' of FIG. 1 when an electric field is applied to a flexible display.

FIG. 1 is a plan view illustrating a flexible display. FIG. 2 is a cross section view along I-I' of FIG. 1 when an electric field is not applied to a flexible display. FIG. 3 is a cross section view along I-I' of FIG. 1 when an electric field is applied to a flexible display.

As shown in FIGS. 1 and 2, the flexible display includes a flexible substrate 11 which is provided with a reflective electrode 17 and a transparent insulation layer 16 having a pigment; an opposing substrate 21 which is provided with an opposite electrode 23 and a black matrix 22. An electrolytic layer 32 which is transparent and a nonelectrolytic layer 31 which is nontransparent are provided between the two substrates. In this example, the flexible display is driven in a reflective mode. That is, after the ambient light passes through the electrolytic layer 32 and the transparent insulation layer 16 having the pigment, the ambient light is reflected on the reflective electrode 17, and returns to the outside so as to display an image. An example of a reflected light path is shown by the broad arrows in FIG. 3.

On the flexible substrate 11, there are disposed a plurality of gate and data lines 12 and 15 which transmit various signals to actively drive a plurality of thin film transistors (TFT). Each of the gate lines is formed perpendicular to each of the data lines, to thereby define pixel regions. A scanning signal may be applied to the gate line, and a data signal may be applied to the data line.

Each pixel is provided with a thin film transistor (TFT) and the reflective electrode 17. Also, each thin film transistor (TFT) is formed adjacent to a crossing of the gate and data lines, such that the thin film transistor (TFT) may control a polarity of a voltage applied to the reflective electrode 17. The reflective electrode 17 is formed of a metal material which can reflect light, such as, aluminum (Al), chrome (Cr), or aluminum neodymium (AlNd).

A transparent insulation layer 16 is formed on a surface of the flexible substrate 11 including the reflective electrode 17. The transparent insulation layer 16 may be formed of a hydrophobic material. Pigment particles of an ionic material having a color are added to the transparent insulation layer 16. In this case, pigment particles of one color may be added to the transparent insulation layer 16, and then the transparent insulation layer 16 may be coated onto the entire surface of the panel, thereby representing one color. Alternatively, the transparent insulation layer 16 may be formed, having R, G and B pigment particles for the pixels, thereby representing the various colors.

In order to form the transparent insulation layer 16, an insulation material of the hydrophobic properties is coated on the substrate 11 by a dipping, dispensing, printing, ink-jet or screen-coating method, and the transparent insulation layer 16 is then cured.

The thin film transistor (TFT) includes a gate electrode 12a extending from the gate line 12; a gate insulation layer (not shown) formed on the gate electrode 12a; a semiconductor layer (not shown) formed above the gate electrode 12a; and source and drain electrodes 15a and 15b extending from the data line 15 and formed on the semiconductor layer, so that the semiconductor layer forms a gate therebetween. The drain electrode 15b is electrically connected with the pixel electrode 17.

The opposing substrate 21 is provided with the opposite electrode 23 which is transparent; and the black matrix 22 which is nontransparent. The opposite electrode 23 is provided at a predetermined separation from the black matrix. The portion provided with the opposite electrode corresponds to a display area which displays the image by transmitting the ambient light, and the portion provided with the black matrix 22 corresponds to a non-display area which blocks the ambient light. The opposite electrode 23 may be formed on the entire surface of the opposing substrate 23.

When a constant voltage is applied to the opposite electrode 23, a vertical electric field exists between the opposite electrode and the reflective electrode.

The opposite electrode 23 may be formed of a transparent and conductive material, such as, Indium Tin Oxide (ITO) or Indium Zinc Oxide (IZO), or the like. The black matrix 22 is formed of a light-shielding material, such as chrome (Cr).

The flexible substrate 11 is opposite and bonded to the opposing substrate 21. The electrolytic layer 32 and the nonelectrolytic 31 are provided between the flexible substrate 11 and the opposing substrate 21.

The electrolytic layer 32 is formed of the electrolytic material having polarity: for example, a water solution. The nonelectrolytic layer 31 is formed of nonelectrolytic material having no polarity: for example, oil. The transparent insulation layer 16 is formed on the flexible substrate 11, and the transparent insulation layer 16 may be formed of the hydrophobic material. Thus, the electrolytic layer 32 of having transparent properties moves upwardly, and the nonelectrolytic layer 31 having nontransparent properties moves downwardly.

As shown in FIG. 2, the ambient light does not pass through the nonelectrolytic layer 31 having non-transparent properties and a black level is obtained.

As the electric field is applied to the flexible display, as shown in FIG. 3, an electric field is formed between the reflective electrode 17 and the opposite electrode 23, and an electric field is not formed between the black matrix 22 and the reflective electrode 17. The electrolytic layer 32 having the relatively large polarity moves to the portion having the electric field formed between the reflective electrode and the opposite electrode, and the nonelectrolytic layer 31 having the relatively small polarity moves to the portion having no electric field between the reflective electrode and the black matrix. This may be referred to as an electro-wetting effect.

Ambient light reaches the reflective electrode 17 through the electrolytic layer 32 and the transparent insulation layer 16, and the light is reflected by the reflective electrode, so that an image is displayed. The white light may be changed to a predetermined color as the white light passes through the transparent insulation layer.

In the example, a flexible display is formed as the reflective type. That is, the electrolytic layer having a relatively large polarity and the nonelectrolytic layer having a relatively small polarity are provided between the two electrodes. When, an electric field is applied between the electrolytic layer and the nonelectrolytic layer, an image may be displayed as a result of the movements of the electrolytic and nonelectrolytic layers. A transparent insulation layer is provided inside the display, such that the transparent insulation layer passes only the predetermined-colored light.

In an aspect, pigment particles of one color may be added to the transparent insulation layer, and then the transparent insulation layer may be coated onto the entire surface of the panel, thereby representing one color. In another aspect, the transparent insulation layer may be formed, having R, G and B pigment particles for pixel, thereby representing the various colors.

The flexible display has no additional color filter layer, so that the flexible display having the color images may be fabricated by a simplified process.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display comprising:
a reflective electrode formed of a metal material which can reflect light on a first substrate;
a transparent insulation layer having a predetermined color formed on the first substrate including the reflective electrode;
a second substrate disposed in opposition to the first substrate;
an electrode formed on a surface of the second substrate and disposed facing the first substrate;
a black matrix formed on the surface of the second substrate adjacent to the electrode, and
an electrolytic layer and a nonelectrolytic layer formed between the first substrate and the second substrate, wherein the electrolytic layer is transparent, and the nonelectrolytic layer is nontransparent.

2. The display of claim 1, wherein the electrolytic layer is formed of a water solution.

3. The display of claim 1, wherein the nonelectrolytic layer is formed of oil.

4. The display of claim 1, wherein the electrode is formed of a transparent conductive material.

5. The display of claim 1, wherein the transparent insulation layer is formed of a hydrophobic material.

6. The display of claim 1, wherein the transparent insulation layer has a single color pigment and is coated on an entire surface of the first substrate.

7. The display of claim 1, wherein the transparent insulation layer has different color pigments and is coated onto the first substrate.

8. The display of claim 7, wherein the transparent insulation layer having the red (R), green (G) or blue (B) colors for each pixel is coated onto the first substrate.

9. The display of claim 1, wherein the transparent insulation layer includes a pigment.

10. The display of claim 1, wherein the second substrate is transparent and flexible.

11. The display of claim 1, wherein the portion of the second substrate provided with the reflective electrode corresponds to an image-display area, and the portion of the second substrate provided with the black matrix corresponds to a non-display area.

12. The display of claim 1, wherein the first substrate includes a gate and a data line formed perpendicularly to each other to define a pixel, and a thin film transistor formed adjacent to a crossing of the gate line and the data line and connected to the reflective electrode.

13. The display according to claim 12, wherein the first electrode is formed inside each pixel of the first substrate.

14. The display according to claim 1, wherein the first substrate is flexible substrate.

15. The display according to claim 1, wherein the second electrode is formed on the entire surface of the second substrate.

16. The flexible display according to claim 1, wherein the transparent electrolyte layer is moved to a first region and the opaque non-electrolyte layer is moved to a region between the first electrode and the black matrix by an electric field formed between the first and second electrodes.

* * * * *